under"*$6*,*5*! %&#$%^

United States Patent [19]
Chen

[11] Patent Number: 6,009,444
[45] Date of Patent: Dec. 28, 1999

[54] TEXT INPUT DEVICE AND METHOD

[75] Inventor: Xixian Chen, Palo Alto, Calif.

[73] Assignee: Motorola, Inc., Schaumburg, Ill.

[21] Appl. No.: 08/804,781

[22] Filed: Feb. 24, 1997

[51] Int. Cl.[6] ............................. H04M 1/27; G06F 13/00
[52] U.S. Cl. ........................ 707/535; 379/353; 379/354; 345/354; 345/356
[58] Field of Search ..................... 707/535, 531, 707/534; 704/9; 379/93.27, 355, 356, 354, 914, 910, 906, 216; 345/327, 352, 353, 354

[56] References Cited

U.S. PATENT DOCUMENTS

| | | | |
|---|---|---|---|
| 4,307,266 | 12/1981 | Messina | 379/355 |
| 4,427,848 | 1/1984 | Tsakanikas | 379/355 |
| 4,650,927 | 3/1987 | James | 379/96 |
| 4,674,112 | 6/1987 | Kondraske et al. | 379/96 |
| 4,737,980 | 4/1988 | Curtin et al. | 379/97 |
| 4,800,582 | 1/1989 | D'Agosto, III et al. | 379/216 |
| 5,117,455 | 5/1992 | Danish | 379/368 |
| 5,303,288 | 4/1994 | Duffy et al. | 379/59 |
| 5,384,831 | 1/1995 | Creswell et al. | 379/67 |
| 5,467,392 | 11/1995 | Norimatsu | 379/354 |
| 5,509,067 | 4/1996 | Murata | 379/355 |
| 5,548,634 | 8/1996 | Gahang et al. | 379/97 |
| 5,619,563 | 4/1997 | Hsiao | 379/368 |
| 5,828,991 | 10/1998 | Skiena et al. | 704/9 |

OTHER PUBLICATIONS

Davis, J. R., Let Your Fingers do the Spelling: Implicit disambiguation of words spelled with the telephone keypad, Mar. 1991.

Ziran Input System User Manual, Ziran Software Limited.

*Primary Examiner*—Joseph H. Feild
*Assistant Examiner*—Cong-Lac Huynh
*Attorney, Agent, or Firm*—Hugh C. Dunlop

[57] ABSTRACT

A text input device (10) and a method of data entry for entering text in a language (e.g. Zhuyin phonetic Chinese), in which a character is representable as a first symbol selected from a first subset of symbols and a second symbol selected from a second subset of symbols, where the first and second subsets are mutually exclusive. A first key on which is displayed a first subset of symbols is activated (e.g. any one of keys 1–6). A candidate first symbol is displayed in response to the step of activating the first key. A second key is activated on which is displayed a second subset of symbols (e.g. any one of keys 7–0). The candidate first symbol is fixed and a candidate second symbol is displayed in response to activating the second key. A third key can be activated (e.g. any one of keys 7–0), on which is displayed a further subset of symbols, whereupon the candidate second symbol is fixed.

14 Claims, 3 Drawing Sheets

| 用 | 電 | 話 | 鍵 | 盤 | 輸 | 入 | 漢 | 字 |
|---|---|---|---|---|---|---|---|---|
| ㄩㄥ | ㄉㄧㄢ | ㄏㄨㄚ | ㄐㄧㄢ | ㄆㄢ | ㄕㄨ | ㄖㄨ | ㄏㄢ | ㄗ |
| 8880000 | 288 | 333887 | 480 | 110 | 55588 | 555588 | 3330 | 6 |

*FIG.4*

TEXT INPUT DEVICE AND METHOD

FIELD OF THE INVENTION

This invention relates generally to a data entry method and apparatus, and more particularly to a method and apparatus for inputting text messages from a keypad, for example entering Zhuyin phonetic Chinese in a numeric keypad.

BACKGROUND OF THE INVENTION

With the increasing desire to carry smaller and smaller personal communicating devices with optimum functionality such as pagers, cellular phones, and other personal communicator devices, and the desire to automate homes through combinations of telecommunications and cable where smart rooms will have one or more small devices that operate a variety of appliances or control a variety of applications; the need and desire to enter alphanumeric text through non-alpha or numeric keypad is ever increasing.

In the United States of America it is standard for every telephone keypad to have letters as well as numerals displayed on the keys. Thus, the key representing the numeral "2" has the letters A, B and C displayed and the key representing the numeral "3" has the letters D, E and F etc. It is common to represent a telephone number by the letters which correspond to the digits on the keypad.

Various approaches for entering alphanumeric input through a non-alpha, numeric only, or other type of keypad having fewer keys or buttons than the corresponding alphabet have been developed or are known. Many of these methods take advantage of the letters displayed on the standard US telephone keypad. However, often the methods associated with the alphanumeric text through the keypad are cumbersome and difficult to edit. In addition, typically the entry must be restricted or entered in a specific manner such that there is only one option per sequence of input. More specifically, there is a direct correlation for a specific input to a specific letter of the alphabet or a symbol. For example, if a user wants to input the word "call" through a non-alpha keyboard, the user has to enter a specific combination of numbers and/or symbols to indicate the word "call". By way of example, for a user to enter the word "call" the user must enter the following: 2\*\*\*; 2\*; 5\*\*\*; 5\*\*\*; #. Such a method of inputting is very restrictive, time consuming, and editing is difficult and slow.

The above described methods of data entry do not readily apply themselves to the Chinese language. There are several thousand characters in the Chinese language. For example, there are nearly 7000 Chinese characters supported by the GB coding standard used in China, and about 13000 Chinese characters supported by the Big5 coding standard used in Taiwan and Hong Kong. It is a major challenge to build a device that can select characters from such a large dictionary using a small number of keys, for example just 12 keys of an electronic keypad.

Therefore a need exists to provide a user with a simple straightforward method and apparatus for inputting text through a keypad having fewer keys than the desired alphabet; and the need exists to provide such a system without resort to massive computational power or memory demand.

A preferred embodiment of the invention are now described, by way of example only, with reference to the accompanying drawings.

BRIEF DESCRIPTION OF THE DRAWINGS

FIG. 4 is an illustration of Chinese text, Zhuyin symbols and corresponding key activations entered using the present invention.

DETAILED DESCRIPTION OF PREFERRED EMBODIMENTS

There are two sets of Chinese phonetic symbols that are currently used in China to represent the pronunciations of Chinese characters. One is Pinyin which is used in mainland China. The other is Zhuyin which is used in Taiwan. The pinyin for each Chinese character, like English, is made up from combinations of the 26 letters of the Roman alphabet a–z. The Zhuyin for each Chinese character is made up from the combinations of 37 Chinese Zhuyin phonetic symbols. A single character comprises from one to three symbols, referred to herein as symbols. Each symbol is represented by a simplified Chinese character. In order to enter a Chinese character by using its Zhuyin, these 37 phonetic symbols are mapped to 10 telephone digit keys.

Figure 1:
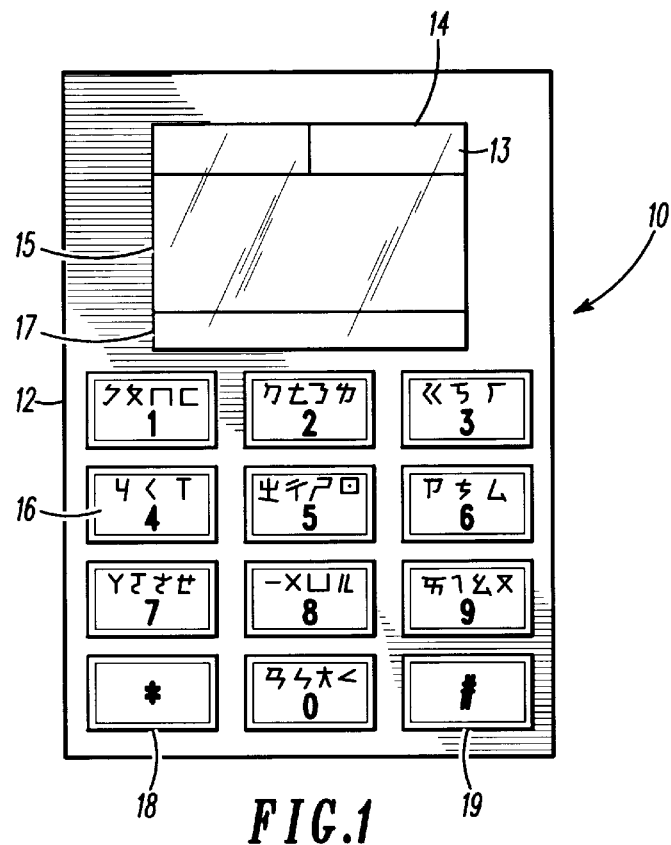
FIG. 1 is a front view of an illustrative text entry device suitable to receive input in accordance with the present invention.

Referring now to the figures, FIG. 1 illustrates a general and preferred embodiment of apparatus in accordance with the present invention. An example of a text input device 10 in the form of a cellular telephone (or other data entry device such as a wireline telephone, pager or personal digital assistant or telecommunications device) having a keypad is illustrated. The text input device 10 depicted comprises a housing 12, a display 14 and a keypad 16 through which input is received. The display 14 has a text display area 15, a small window 13 and an area 17 for displaying character alternatives. The keypad 16 has twelve keys with digits 0–9 displayed thereon in a standard layout.

It is a feature of Zhuyin that the 37 symbols can be grouped into a first set and a second set. Where a character is represented by just one Zhuyin symbol, that symbol can be drawn from either the first set or the second set. Where there is a second or third symbol, the second or third symbol is drawn exclusively from the second set.

FIG. 1 shows the mapping of 37 Chinese phonetic symbols to 10 telephone digit keys. The first set of symbols comprises 21 phonetic symbols. These are displayed on keys 1–6 of keypad 16. The second set of symbols comprises 16 phonetic symbols. These are displayed on keys 7–0 of keypad 16. The lower left hand key 18 has the symbols "\*" (referred to as "star"). The lower right hand key 19 has the symbols "#" (referred to as "pound").

It is also a feature of Zhuyin that the symbols can be divided into mutually exclusive subsets where a symbol selected from one subset is never followed in the same character by a symbol drawn from the same subset (i.e. no two symbols on one key occur consecutively). Thus, each of the keys 1–0 in FIG. 1 is marked with a mutually exclusive subset of symbols to which this rule applies. This feature is used to great advantage in the present invention as is described below.

Generally, the method of operation of the device comprises: activating a first key (e.g. one of keys 1–6) on which is displayed a first subset of symbols; displaying a candidate first symbol in response to the step of activating the first key; activating a second key (e.g. one of keys 7–0) on which is displayed a second subset of symbols, mutually exclusive with respect to the first subset; fixing the candidate first symbol and displaying a candidate second symbol in response to the step of activating the second key.

Figure 2:
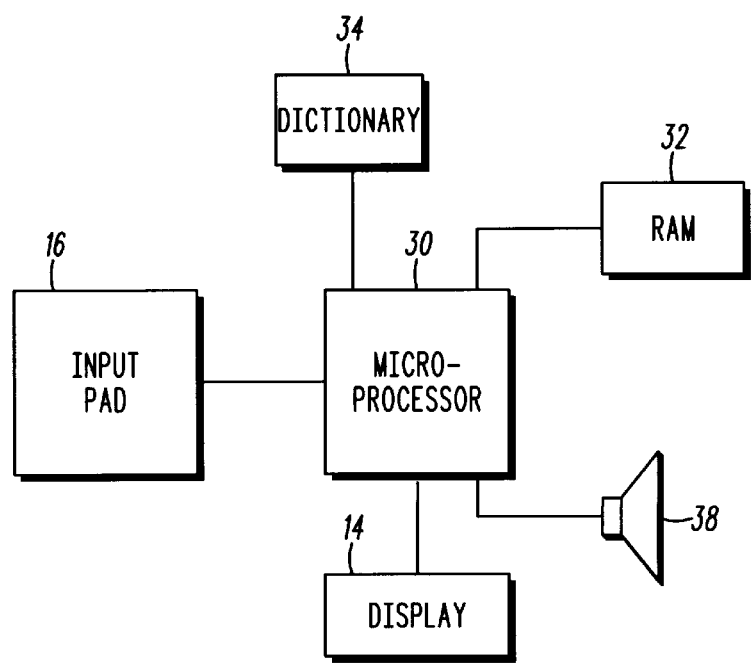
FIG. 2 is a block diagram detailing internal circuitry of the device of FIG. 1.

Referring to FIG. 2, the cellular telephone or other text input device 10 is illustrated as having a microprocessor 30 coupled to the input pad 16 and to the display 14 using standard input and output drivers as are known in the art. Also coupled to the microprocessor 30 are a first memory 31 which is preferably electrically-erasable read-only memory (EEPROM) and a second memory 32 which is preferably random access memory (RAM). In the EEPROM memory is stored a dictionary of Chinese characters. An optional loudspeaker 38 is shown coupled to the microprocessor.

In operation the user is required to press the same telephone key several times for its corresponding Chinese phonetic symbol. For example, if the user wants to input the fourth Chinese phonetic symbol shown on key 1, he presses key 1 four times. When he presses key 1 the first time, the small window 13 on the top right of the display 14 displays the first Chinese phonetic symbol shown on key 1. On pressing key 1 the second time, the second Chinese phonetic symbol is displayed. On pressing key 1 the third time, the third Chinese phonetic symbol is displayed. On pressing key 1 the fourth time, the fourth Chinese phonetic symbol is displayed, which is the one desired. The user can then press another key to enter another Chinese phonetic symbol in the same way as described before. Pressing another key has two functions. It causes the present, desired symbol to be temporarily fixed in the window 13 and it causes the next candidate symbol to displayed in the window 13. For example, if key 8 is pressed, the first symbol "-" displayed on key 8 is displayed as a candidate symbol in the window 13. The user can scroll through the symbols marked on key 8 until the desired symbol is shown.

A feature of the arrangement is that no special key need to be activated between activation of these two keys. No special key needs to be activated to signify selection of the desired symbol from key 1. This feature makes operation of the device faster and more intuitive.

When finished the user presses key 19 ("#"). This causes the combined symbols in window 13 to be treated as a final selected character. The processor 30 looks up the desired character in dictionary 31. For many combinations of symbols there will be more than one corresponding character in dictionary in memory 31. The desired character is selected from the set of retrieved characters by displaying the top ten retrieved characters in display portion 17 and the user can select the desired choice by activation one of keys 1–0.

Figure 3:
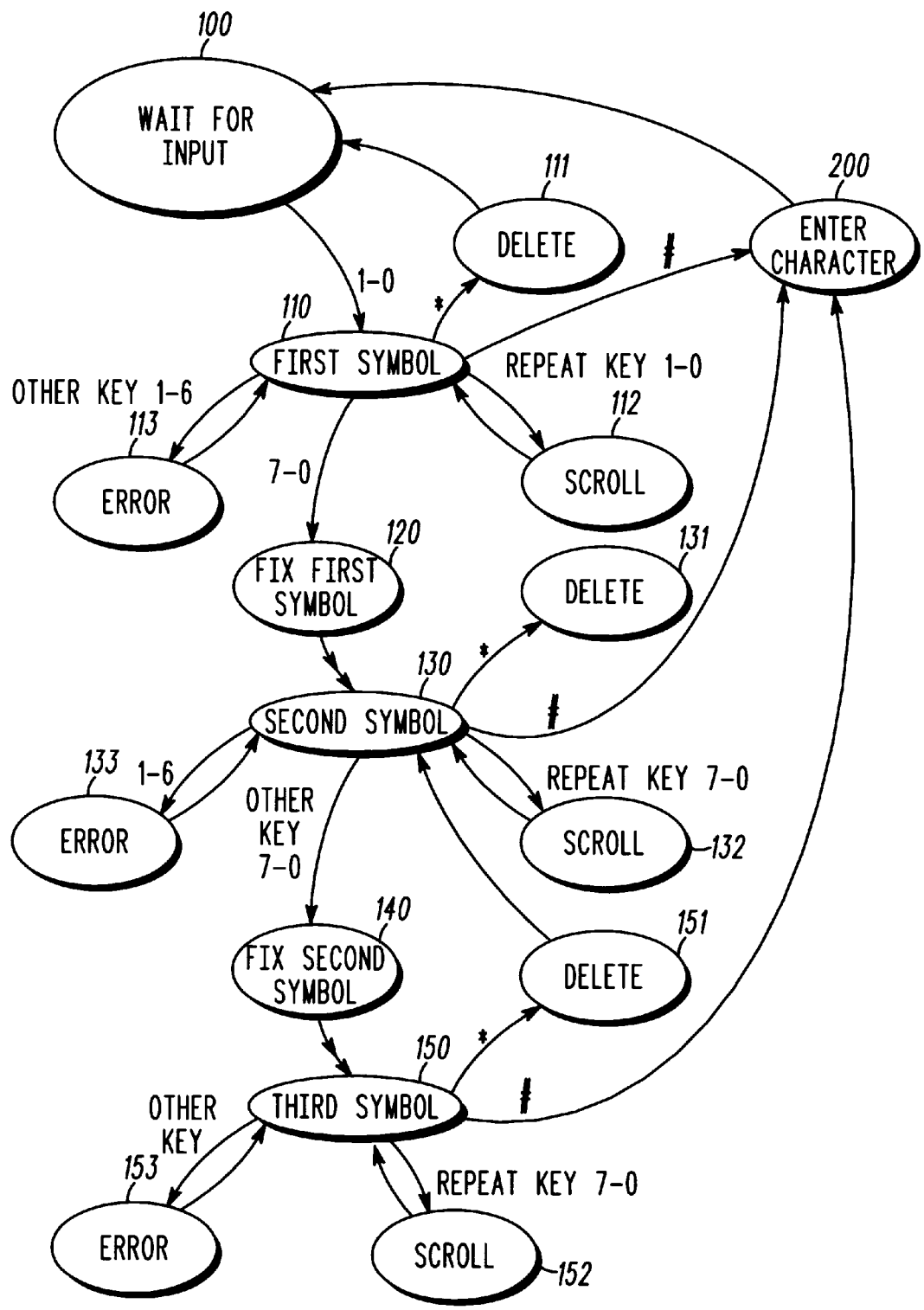
FIG. 3 is a state diagram illustrating operation of the device of FIG. 1.

Details of operation of the program stored in EEPROM 32 and performed by processor 30 are illustrated from the state diagram of FIG. 3.

The process starts at step 100 where processor 30 waits for activation of a key of the input pad 16. The program waits for input of one of the digits 1 to 0. From entry of one of the digits 1 to 0 the program proceeds to step 110. If the user has activated the wrong key, he can activate key 18 and step 111 is entered causing the previous activation to be deleted and causing the program to return to step 100. If, from step 110, the user repeats the previous key activation, step 112 causes the various symbols of that key to be scrolled in sequence (as described above). When the desired symbol is displayed in window 13, the user can activate one of keys 7 through 0 to proceed to step 120. If the user activates a different key of keys 1 through 6, this is an error, because keys 1 through 6 represent first symbols of characters and a first symbol of a character cannot be followed by another first symbol of character. If one of these keys is activated, the process proceeds to step 113 and an error warning is given. Error warnings are given in step 113 and other steps described below by providing a "beep" through loudspeaker 38 or by other means.

If, from step 110, the user activates key 19, the process proceeds to step 200. Key 19 represents completion of character entry and step 200 causes the character or characters which correspond to the symbol(s) displayed in window 13 to be displayed in display area 17. From here, the desired character can be selected and entered in display area 15 and also forwarded to the active application (e.g. a word processor application).

If the character currently being entered comprises two symbols, the user can activate one of keys 7 through 0 and proceed to step 120. Step 120 causes a first symbol or first part to be temporarily fixed in window 13. From step 120 the program automatically proceeds to step 130. Step 130 is very similar to step 110. From step 130, the user can delete the previously entered symbol by pressing key 18 and step 131 causes the program to return to step 110. Also from step 130, the user can scroll through the symbols displayed on the activated key by repeating activation of the same key (step 132). If the user activates one of keys 1 through 6, this is an error, because keys 1 through 6 display only first symbols of characters. Activation of one of these keys causes the program to proceed to step 133 and an error warning is given. If the user activates a different key of this set of keys 7 through 0, the program proceeds to step 140. Step 140 causes the second symbol of the character to be fixed in window 13 and the program immediately proceeds to step 150. Step 150 is very similar to step 130. If the user has made a mistake, he can press key 18 and return by a step 151 to step 130. If the user repeats the key just activated, step 152 causes the optional symbols displayed on the key to be scrolled in sequence and displayed in sequence in window 13. If the user activates any other key, i.e. any of keys 1 through 6 and any other key of keys 7 through 0, step 153 is reached and an error warning is given.

If, after displaying a desired second symbol in step 130 or displaying a desired third symbol (in the case of a 3-symbol character) the user activates key 119, the process proceeds to step 200 and a look-up is performed in the dictionary in memory 31. The character or characters corresponding to the entrance symbols is/are read from dictionary and displayed in display portion 17 for user selection.

FIG. 4 shows an example of entering a Chinese sentence by using based method. The first line is the Chinese sentence "Input Chinese characters using telephone keypads" which is made up from 9 Chinese characters. The second line is the Zhuyins corresponding to these Chinese characters. The third line is the digit strings that the user actually entered in order to get these Zhuyins.

There are two unique features of the mapping shown in FIG. 1. First, the 37 Chinese Zhuyin phonetic symbols are mapped to 10 telephone digit keys in an order of Chinese phonetic sequence, so a user can easily find the keys corresponding to the Chinese phonetic symbols. Second, as mentioned before, the Zhuyin for each Chinese character contains at least one and at most three Zhuyin symbols. The mapping of symbols to keys is constructed such that only one of the Zhuyin symbols mapped to the same telephone digit key can be used to make up the Zhuyin of each Chinese character. For example, suppose that a Zhuyin of a Chinese character contains two Zhuyin symbols. When the user enters its first Zhuyin symbol by using a certain key, he must leave that key and press another key to enter its second Zhuyin symbol, that is, he can not use the same key to get the second Zhuyin symbol. This feature eliminates the process of entering an extra key to indicate the end of each entered Zhuyin symbol as usually required by the conventional methods for entering English words using 10 telephone keys.

It is also possible to employ the knowledge of Zhuyin to reduce the number of keys required to enter Chinese characters using Zhuyin and to speed up the process of entering Zhuyin symbols. Since there are only 408 legitimate Zhuyins for all Chinese characters, they can be stored in a tree structure table in the memory. After entering the first Zhuyin symbol, the program identifies (in step 130 of FIG. 3) the next possible Zhuyin symbols that can follow it, (i.e. it eliminates impossible symbols). When the user presses another key and tries to enter the second Zhuyin symbol, the program displays one by one only the possible Zhuyin symbols that can follow it and thus speeds up the process of entering the Zhuyin symbols. For example, after entering the 4th Zhuyin symbol on key 1 by pressing key 1 four times, the user proceeds to enter key 8 a first time. Since the first Zhuyin symbol "-" on key 8 cannot follow the 4th Zhuyin symbol on key 1, the program displays the 2nd Zhuyin symbol on key 8 instead of displaying the 1st symbol "-". By comparing the Zhuyin symbols entered, with the sequences entered in the Zhuyin table, the program can also give the user an error warning if he enters the wrong key.

The above description has been given by way of example only, and modifications of detail can be made within the scope and spirit of the invention.

What is claimed is:

1. A method of data entry for entering text in a language wherein a character is representable as a first symbol selected from a first subset of symbols and a second symbol selected from a second subset of symbols, where the first and second subsets are mutually exclusive, the method comprising:

activating a first key on which is displayed a first subset of symbols;

displaying a candidate first symbol in response to the step of activating the first key;

activating a second key on which is displayed a second subset of symbols; and fixing the candidate first symbol and displaying a candidate second symbol in response to the step of activating the second key.

2. The method of claim 1 further comprising:

fixing the candidate second symbol; and performing a look-up in a dictionary of characters and selecting at least one character corresponding to the first and second symbols in combination.

3. The method of claim 2 further comprising displaying a plurality of characters corresponding to the first and second symbols in combination and selecting one of the displayed characters.

4. The method of claim 1 further comprising, following the step of activating the second key:

activating a third key different from the second key on which is displayed a subset of symbols different from the second subset; and fixing the candidate second symbol and displaying a candidate third symbol in response to the step of activating the third key.

5. The method of claim 4 further comprising:

fixing the candidate third symbol; and performing a look-up in a dictionary of characters and selecting at least one character corresponding to the first, second and third symbols in combination.

6. The method of claim 1 comprising a step of eliminating symbols which cannot follow the candidate first symbol and, in response to said step of activating a second key, displaying a symbol represented by the second key excluding symbols eliminated.

7. A keypad for entering text in a language wherein a character is representable as a first symbol selected from a first set of symbols and a second symbol selected from a second set of symbols, where the first and second sets are mutually exclusive, the keypad comprising:

a first set of keys each having marked thereon a plurality of symbols from the first set of symbols;

a second set of keys each having marked thereon a plurality of symbols from the second set of symbols;

means for activating the first key on which is displayed the first set of symbols;

a display for displaying a candidate first symbol in response to the step of activating the first key;

means for activating a second key on which is displayed the second set of symbols; and means for fixing the candidate first symbol and displaying a candidate second symbol in response to the step of activating the second key.

8. A method of data entry for entering text in a language wherein a character is representable as a first symbol selected from a first set of symbols and a second symbol selected from a second set of symbols, where the first and second sets are mutually exclusive, the method comprising:

activating a key of a first set of keys;

displaying a candidate first symbol in response to the step of activating a key of the first set of keys;

activating a key of a second set of keys; and entering the candidate first symbol and displaying a candidate second symbol in response to the step of activating a key of the second set of keys.

9. The method of claim 8 for entering text in a language wherein characters have representations comprising a third symbol selected from the second set of symbols, the method further comprising, following the step of activating a key of the second set of keys:

activating a key of the second set of keys; and entering the candidate second symbol and displaying a candidate third symbol in response to the step of activating a key of the second set of keys.

10. The method of claim 8, further comprising displaying a character equivalent to the candidate first symbol and the candidate second symbol in combination upon activation of a predefined entry key.

11. A data entry device for entering text in a language wherein a character comprises a first symbol selected from a first set of symbols and a second symbol selected from a second set of symbols, where the first and second sets are mutually exclusive, comprising:

a keypad having a first set of keys with the first set of symbols marked thereon and a second set of keys with the second set of symbols marked thereon, where keys of the first and second sets have multiple symbols marked thereon;

a display; and a processing device coupled to the keypad and the display operable to cause symbols to be displayed on the display in response to activation of the keys, the processing device causing the display to display a candidate first symbol in response to the activation of the first key, the processing device further fixing the candidate first symbol and causing the display to display a candidate second symbol in response to the activation of the second key.

12. A data entry device for entering text in a language wherein a character comprises a first symbol selected from a first set of symbols and a second symbol selected from a second set of symbols, where the first and second sets are mutually exclusive, comprising:

a keypad having a first set of keys with the first set of symbols marked thereon and a second set of keys with the second set of symbols marked thereon, where keys of the first and second sets have multiple symbols marked thereon;

a display; and a processing device coupled to the keypad and the display, the processing device operable to cause symbols to be displayed on the display in response to activation of the keys, the processing device having instructions and data stored therein which cause it to change a symbol in the display upon repeated activations of a key and fix a symbol of the first set of symbols in the display upon activation of a key of the second set of keys.

13. A data entry device according to claim 11 wherein the display has a first display portion and a second display portion, wherein symbols are displayed in the first display portion and characters are displayed in the second display portion.

14. A data entry device according to claim 11 further comprising a memory having stored therein a dictionary of characters, the memory being coupled to the processing device.

* * * * *